United States Patent
Krayden et al.

(10) Patent No.: US 11,818,230 B2
(45) Date of Patent: Nov. 14, 2023

(54) VIRTUALIZATION OF MULTIPLE NETWORK FUNCTIONS IN HIGH-SCALE ROUTING

(71) Applicant: DRIVENETS LTD., Raanana (IL)

(72) Inventors: Amir Krayden, Hertzelia (IL); Evgeny Sandler, Herzliya (IL); Eliezer Kosharovsky, Kfar Saba (IL); Yehonatan Lemberger, Lod (IL)

(73) Assignee: DRIVENETS LTD., Raanana (IL)

( * ) Notice: Subject to any disclaimer, the term of this patent is extended or adjusted under 35 U.S.C. 154(b) by 3 days.

(21) Appl. No.: 17/119,012

(22) Filed: Dec. 11, 2020

(65) Prior Publication Data

US 2022/0191302 A1  Jun. 16, 2022

(51) Int. Cl.
*H04L 29/08* (2006.01)
*H04L 67/60* (2022.01)
*H04L 67/10* (2022.01)

(52) U.S. Cl.
CPC .............. *H04L 67/60* (2022.05); *H04L 67/10* (2013.01)

(58) Field of Classification Search
CPC .............................. H04L 67/32; H04L 67/10
See application file for complete search history.

(56) References Cited

U.S. PATENT DOCUMENTS

| | | | |
|---|---|---|---|
| 7,636,908 B1* | 12/2009 | Brebner | G06F 30/327 |
| | | | 716/102 |
| 10,038,629 B2* | 7/2018 | Fang | G06F 9/45558 |
| 10,205,636 B1* | 2/2019 | Evans | H04L 41/40 |
| 10,511,485 B2* | 12/2019 | Wu | H04L 41/122 |
| 10,860,374 B2* | 12/2020 | Hearn | G06F 9/5011 |
| 10,901,805 B2* | 1/2021 | Feldkamp | G06F 9/5027 |
| 10,999,766 B2* | 5/2021 | He | H04W 28/0958 |
| 11,036,531 B2* | 6/2021 | Connor | G06F 9/45558 |

OTHER PUBLICATIONS

Jalali Fatemeh et al. "Dynamic Edge Fabric EnvironmenT: Seamless and Automatic Switching Among Resources at the Edge of IoT Network and Cloud" 2019 IEEE International Conference on Edge Computing (Edge), IEEE pp. 77-86, Aug. 7, 2019.

\* cited by examiner

*Primary Examiner* — Nazia Naoreen
(74) *Attorney, Agent, or Firm* — Browdy and Neimark, PLLC (57) ABSTRACT

A network processing element and method for using it, are provided for use in a cluster comprising a plurality of network processing elements, wherein the network processing element is configured to enable provisioning of a plurality of different services, wherein the network processing element is configured to store state data associated with one or more functions required for carrying out each of the plurality of different services, and wherein the network processing element is further configured to provide a service or part thereof, based on the state data associated the network processing element's processing resources required for carrying out one or more functions in the provisioning of the requested service.

9 Claims, 6 Drawing Sheets

VIRTUALIZATION OF MULTIPLE NETWORK FUNCTIONS IN HIGH-SCALE ROUTING

TECHNICAL FIELD

The present disclosure generally relates to the field of communication systems. More particularly, the present disclosure relates to systems implementing infrastructure for multiservice routing, virtual network function virtualization and software-defined networking.

Glossary

ACL—Access Control List.
BFD—Bidirectional Forwarding Detection.
CE—Customer element.
CPU—Central processing unit.
CSP—Content security policy.
DDOS—Distributed denial-of-service
ECHP—Equal-cost multi-path routing.
FIB—Forwarding Information Base.
FLOPS—Floating point Operations Per Second (FLOPS, or flop/s).
Gbps—Giga bit per second.
ISL—Inter Service Link.
ISP—Internet service provider.
MIPS—Microprocessor without Interlocked Pipelined Stages.
NPLS—Multiprotocol Label Switching.
NCF—Network Cloud Fabric.
NCP—Network Cloud Packet Forwarder.
NIF—Network Interface.
NPU—Network Processing Unit.
OTN—Optical Transport Network.
QinQ—refers to Ethernet networking standard IEEE 802.1ad. The technique is also known as provider bridging, Stacked VLANs, or simply QinQ or Q-in-Q. It can be applied by devices that support this standard, to C-tag stacking on C-tag.
PE—Processing Element.
PPS—Pulse Per Second.
QoS—Quality of service.
TCAN—Ternary Content-Addressable Memory.
VLAN—Virtual Local Access Network—A network or part of a network that operates separately from the Internet. VLAN is an approach that enables separating between networks operating within the same physical network.
VPN—Virtual Private Network.

BACKGROUND

Typically, multiple network services are provided to customers by using discrete communication devices implemented by means of dedicated routers. There are many reasons for adopting this approach, such as the ability to utilize different operational models that are implemented for various network entities (e.g. core networking, enterprise services, mobility services, best-effort peering and internet services and the like).

Unfortunately, implementing such a network topology is bound to be subjected to substantial adverse effects both on the CAPES and OPEX of the system, as well as on the ability to improve optimization of power consumed, rack efficiency, and resources' consumption, hence an improved solution to the above difficulties is desired.

SUMMARY

The disclosure may be summarized by referring to the appended claims.

It is an object of the present disclosure to provide a novel network processing element, infrastructure and a method for using it, for hosting and provisioning of a plurality of different services.

It is another object of the present disclosure to provide a novel network processing element, and a method for hosting and provisioning of a plurality of different services e.g. networking and third party services which benefits from such a model by utilizing state data associated with one or more functions required for carrying out each of the plurality of different services.

It is another object of the present disclosure to provide a novel network processing element, a system and a method for allocating resources required to carry out a service or a part thereof, based on the availability of these resources in the various network processing elements that belong to a cluster, wherein the allocation of the processing resources is based on state data associated with the different network processing elements, thereby carrying out one or more functions in the provisioning of the requested service by a number of different network processing elements.

Other objects of the present disclosure will become apparent from the following description.

According to a first embodiment of the present disclosure there is provided a network processing element (e.g. an NPU) for use in a cluster comprising a plurality of network processing elements,
wherein the network processing element is configured to enable provisioning of a plurality of different services,
wherein the network processing element is configured to store state data associated with one or more functions required for carrying out each of the plurality of different services, and
wherein the network processing element is further configured to provide a service or part thereof, based on the state data associated with the network processing element's resources required for carrying out one or more functions while providing the requested service.

According to another embodiment of the present disclosure, the service or part thereof that is provided by the network processing element, is provided in response to a request for provisioning that service received by another network processing element belonging to the cluster.

By yet another embodiment, the request for the provisioning of the service that was directed to the other network processing element, is forwarded from the other network processing element to the present network processing element in response to the other network processing element being under congestion.

In accordance with another embodiment the request for the provisioning of the service that was directed to the other network processing element, is forwarded from that other network processing element to the present network processing element in response to determining that the other network processing element is not provided with means that could have enabled it to provide the required service.

According to still another embodiment, the network processing element is further configured to receive a request for the provisioning of a service at any one of the ports (e.g. physical or logical ports) associated with that network processing element, irrespective of whether the requested service can be provided via the receiving port. One of the major advantages of this embodiment is that it allows the virtualization of different ports and the use of any physical or logical port in the context of any service, thereby enabling a significant cost reduction, and is essentially equivalent to using virtual machines on top of a physical compute element.

In accordance with another embodiment of the present disclosure, the network processing element is further configured to store state data associated with a plurality of functions required for the provisioning of a plurality of services.

By yet another embodiment, the network processing element comprises a non-IP interface configured to implement an Inter Service Link (ISL) through which control and data traffic is forwarded between different network functions over the network fabric as if the network processing elements belonging to the cluster are physically connected there-between. One of the major advantages of this embodiment is that it allows different services to interact with one another as if they were physically connected and at the same time, lowering the total power consumption and inter-service/router delays.

According to another aspect of the present disclosure, there is provided a method for use by a cluster comprising a plurality of network processing elements, wherein at least two of the network processing elements comprised in the cluster are configured to enable provisioning of a plurality of different services, and wherein each of the plurality of network processing elements is configured to provide a service or part thereof for which a request for the provisioning of that service was received by a network processing element from among the plurality of network processing elements comprised in the cluster, and wherein the method comprises the steps of:
  (i) providing state data associated with a plurality of functions required for carrying out a plurality of different services, and storing respective state data at each of the plurality of network processing elements;
  (ii) receiving, by a network processing element belonging to the plurality of network processing element, a request for provisioning of a service;
  (iii) establishing which resources are required for provisioning that service;
  (iv) determining which one or more of the plurality of network processing elements may be used for the provisioning of the requested service, based on state data associated with instantaneous availability of processing resources of the one or more of the plurality of network processing elements (e.g. by implementing a min-max solution); and
  (v) providing the requested service by one or more of the network processing elements determined in step (iv).

This embodiment enables optimal resource allocation in an intelligent way—and a very important functionality in multiplexing a plurality of services of a shared infrastructure.

According to another embodiment of this aspect of the disclosure, the request for provisioning of the service was received by a first network processing element belonging to the cluster and at least part of the requested service provided was carried out by a second network processing element belonging to the cluster.

In accordance with another embodiment of this aspect, the request for the provisioning of the service that was directed to the first network processing element, is forwarded from that first network processing element to the second network processing element in response to the first network processing element being under congestion.

By yet another embodiment, the request for the provisioning of the service that was directed to the first network processing element, is forwarded from that first network processing element to the second network processing element in response to determining that the first network processing element is not equipped with means that could have enabled it to provide the required service.

In accordance with another embodiment, the request for the provisioning of a service is received at any one of the ports associated with one of the network processing elements, irrespective of whether that service can be provided via the receiving port.

According to still another embodiment step (iv) of the method provided, further comprises determining current availability of memory at each of the plurality of network processing elements that belong to the cluster.

By yet another embodiment step (iv) further comprises a step of following the determination of which one or more of the plurality of network processing elements may be used for the provisioning of the requested service, determining which functions will be carried out by each of the determined one or more of the plurality of network processing elements.

According to still another embodiment, the method provided further comprising a step of carrying out a paging mechanism for multiplexing a plurality of network functions carried out by a single network entity (e.g. a router, a cluster, a network fabric and the like).

The term "paging" as used herein throughout the specification and claims is used to denote a memory management scheme by which a computer stores and retrieves data from a secondary storage for use in the main memory. In this scheme, the operating system retrieves data from secondary storage in same-size blocks referred to as pages. Paging is a part of virtual memory implementations in operating systems, using secondary storage to let programs exceed the size of available physical memory.

According to another aspect of the present disclosure, there is provided a system comprising a plurality of network processing elements described hereinabove, wherein that system is configured to provide a plurality of services, where each of these services is provided by using a number of network processing elements selected from among that plurality of network processing elements, while at least two of the selected network processing elements carry out each at least one different task from the one or more tasks carried by the other of the at least two network processing elements.

BRIEF DESCRIPTION OF THE DRAWINGS

The accompanying drawing, which is incorporated herein and constitute a part of this specification, illustrates an embodiment of the disclosure and, together with the description, serve to explain the principles of the embodiments disclosed herein.

DESCRIPTION OF EXEMPLARY
EMBODIMENTS

Some of the specific details and values in the following detailed description refer to certain examples of the disclosure. However, this description is provided only by way of example and is not intended to limit the scope of the invention in any way. As will be appreciated by those skilled in the art, the claimed distributed routing system may be implemented by using other devices that are known in the art per se. The scope of the invention can be summarized by referring to the appended claims.

Deploying a successful white box-based routing infrastructure in the challenging environment of SP core networks requires a collaboration between multiple providers. The present disclosure enables delivering an overall definition of the architecture as well as its various networking software pieces.

Figure 1:
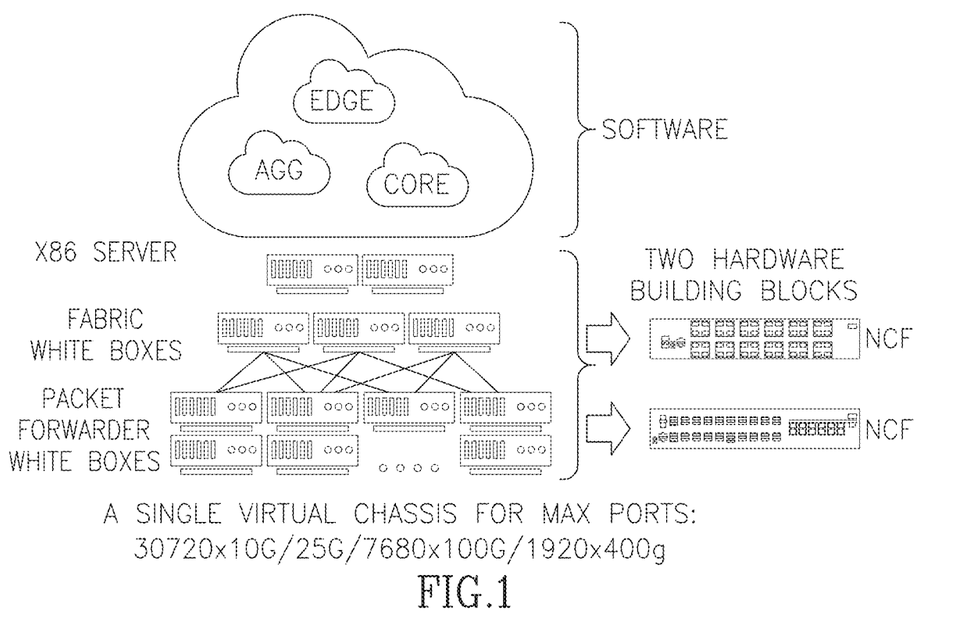
FIG. 1 illustrates a schematic view of an example of a network cloud cluster comprising various network processing elements that are collapsed into a single hardware, construed in accordance with an embodiment of the present invention.
Figure 2:
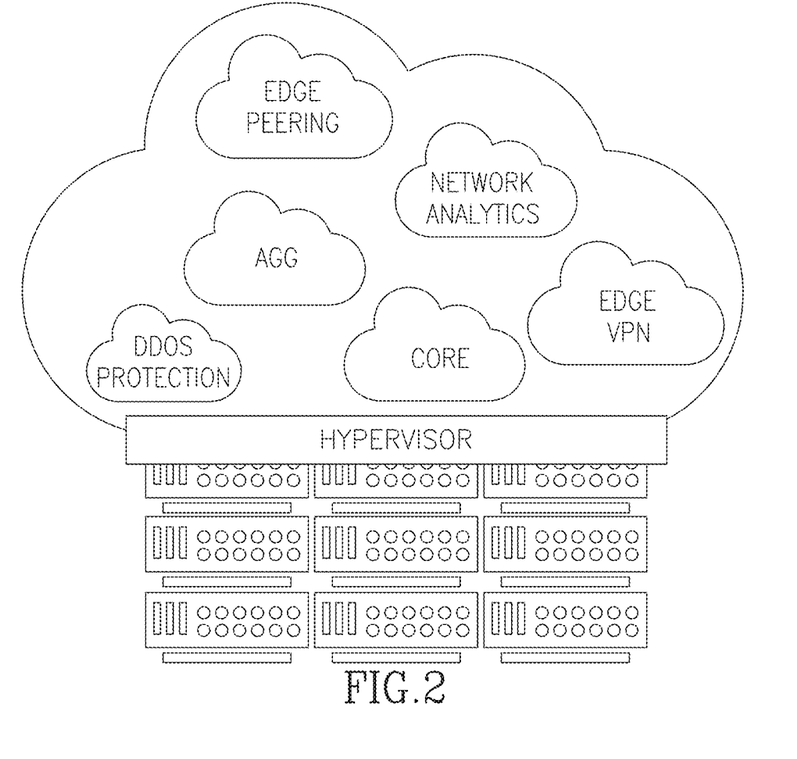
FIG. 2 illustrates a schematic view of another example of a unified infrastructure that enables provisioning of any service on any port, construed in accordance with another embodiment of the present invention.

As discussed above, the solution provided by the present disclosure is one that enables collapsing various network processing elements into a single hardware fabric as demonstrated in FIGS. 1 and 2.

FIG. 1 illustrates a schematic example of a network cloud cluster comprising a plurality of white boxes each configured to be used as a Network Cloud Packet forwarder (NCP) that executes traffic forwarding and is further configured to hold data-path features, including FIB tables, access management lists, DDOS attack mitigation, Quality of Service (QoS) classification and VLAN QinQ tagging, and the like. Typically, an NCP white box includes a high-speed packet processor, such as for example Broadcom's Jericho II, and its ports handle traffic at speeds of up to 400 Gb/s, with total device capacity of 4 Tb/s. A single NCP may function as a standalone router, while multiple NCPs can be clustered over a fabric to deliver capacity of hundreds of terabits by a single routing entity.

With carrier-grade traffic management and large buffers, an NCP may be designed for carrying out network functionalities such as routing, VPNs, MPLS, and tunneling even in demanding environments such as ISP and CSP core networks.

In addition, the network cloud cluster illustrated on FIG. 1 comprises a plurality of white boxes each configured to be used in a Network Cloud Fabric (NCF) which allows a plurality of NCPs to scale their data-path well beyond the capacity of a single device. Depending on the size of a cluster, a plurality of NCF's white boxes can be used for data-path connectivity within a single virtual chassis. In other words, the fabric comprising white boxes is collapsed according to the solution provided, into a virtual single hardware network cloud fabric, while the plurality of white boxes configured to operate as packets' forwarders, may be collapsed into a virtual single hardware NCP.

A network cloud can be deployed in a variety of sizes, starting with a standalone 4 Tb/s router with dozens of ports (a single NCP), all the way to a gigantic 768 Tb/s cluster having thousands of ports. The network cloud clusters are generated by connecting NCPs over a fabric (using NCFs).

FIG. 2 illustrates a schematic view of another example of a unified infrastructure that enables provisioning of any service via any port, construed in accordance with another embodiment of the present invention.

Some efforts were made to allow implementing multiplexing of various network services on the same routers, but none of these efforts were optimized and suitable to tackle operational and technical complexities to achieve a unified solution. Implementations were typically limited to a single function per line-card and port.

Figure 3:
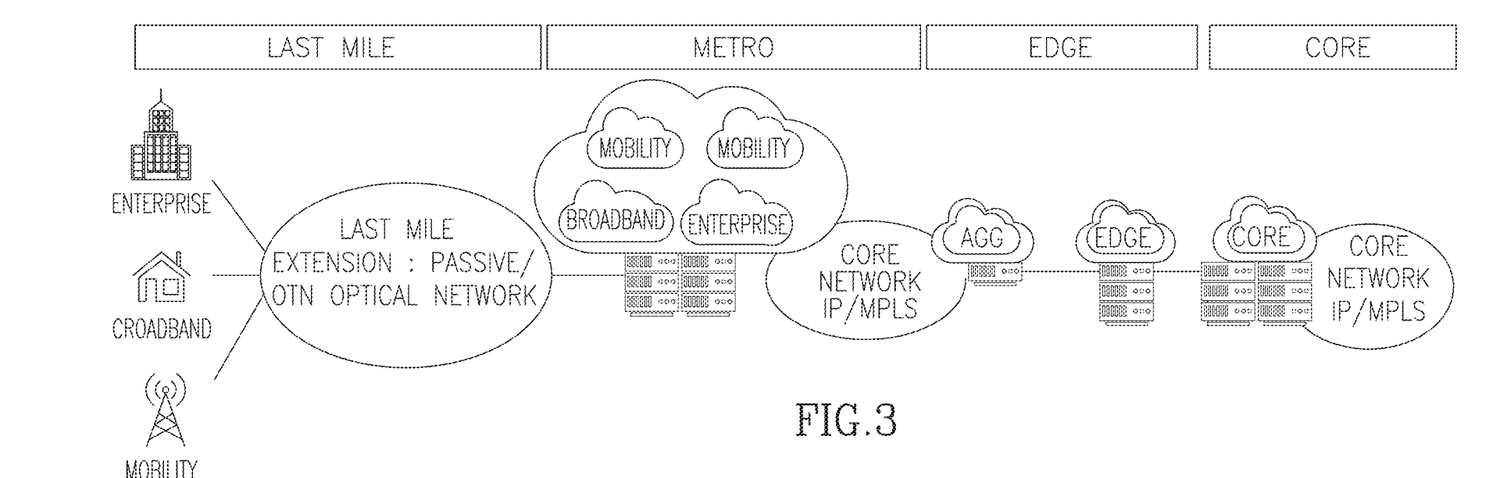
FIG. 3 demonstrates an embodiment of the present disclosure presenting an example of provisioning of any service through any port at any scale.

The example illustrated in FIG. 3, demonstrates an embodiment of the present disclosure showing the provisioning of any service through any port at any scale. The solution exemplified in FIG. 3 comprises a number of networks (sub-systems). A last mile sub-system in which traffic may be carried for example over an OTN optical network through which traffic is conveyed to/from enterprises and/or mobile users and/or broadband users. Next, there is a metro sub-system in which traffic may be carried for example over an aggregation network such as an IP and/or an MPLS network through which traffic is conveyed to/from the last mile sub-system.

Further, there is an edge sub-system in which traffic is conveyed to/from the metro sub-system from/to a core network, in which traffic may be carried for example over an IP and/or an MPLS network.

In order to achieve the above-described solution, it is preferred that the control and management plains are clearly separated and isolated from the data-plains, and that the network processing resources are intelligently allocated between the network functions that require utilizing network processing resources, in order for these network functions to be implemented.

In order to intelligently allocate the network processing resources between the network functions that require utilizing network processing resources, let us consider the differences between virtualization in computing and networking fields.

Before conducting this comparison, let us first make the following definitions:
1. State—the data required for the executing processor (CPU in computing, NPU in networking) algorithm, so that the latter can determine the action to be taken.
2. Execution-path—The hardware processing resources and logical entity on which scheduling takes place (Thread in computing, Packet Flow in networking).
3. Bandwidth—The number of operations that are carried out per second (MIPS/FLOPS in computing, PPS/Gbps in networking).

Figure 4:
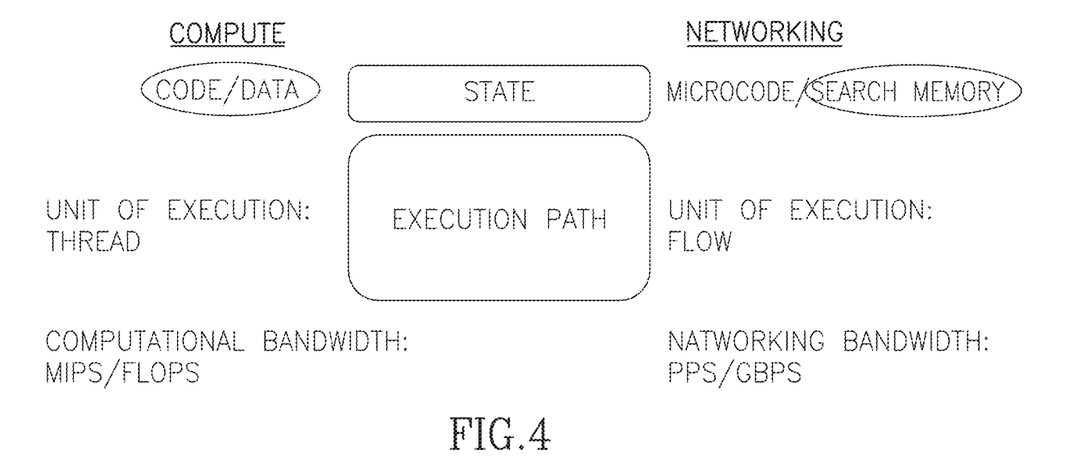
FIG. 4 presents differences between virtualization in computing and networking fields.

These differences are presented in FIG. 4.

As will be appreciated by those skilled in the art, one of the major challenges in virtualizing NPU processing resources is the state memory (e.g., TCAM and counter resources), due to the fact that these state memory parameters are non-linear parameters, they do not allow a paging function to switch between a state of one process to that of another process.

Thus, since no prior art memory paging can be implemented as part of the solution to the problem which the present invention is facing, the inventors found a solution that overcomes this problem. The solution found by the inventors, is based on trading off memory for bandwidth. In order to implement such a solution a research was conducted and it was surprisingly found that the limiting factor for scaling up an applicable configuration is not the ability to process the traffic packets as would have been expected, but rather to store state data so that it can be made available for many functions that may be carried out while using the same NPU.

Unlike traditional approaches in which the allocation function aims to optimize a service on one or more NPUs, the underlying idea of the present invention aims to optimize a plurality of services on NPUs comprised in a cluster of such elements.

Therefore, the present invention is preferably directed to allocate logical (state) processing resources in an intelligent way, thereby enabling individual NPUs that belong to a cluster of NPUs, to operate at a maximal rate, while its memory means is assigned to serve an optimized number of functions.

Thus, in accordance with a preferred embodiment of the present invention, in case that the memory means of a certain NPU cannot be temporarily utilized due to the fact that it is currently under congestion (load), another NPU from among the NPU's cluster members will be selected for taking over the responsibility for the implementing the required function.

Figure 5:
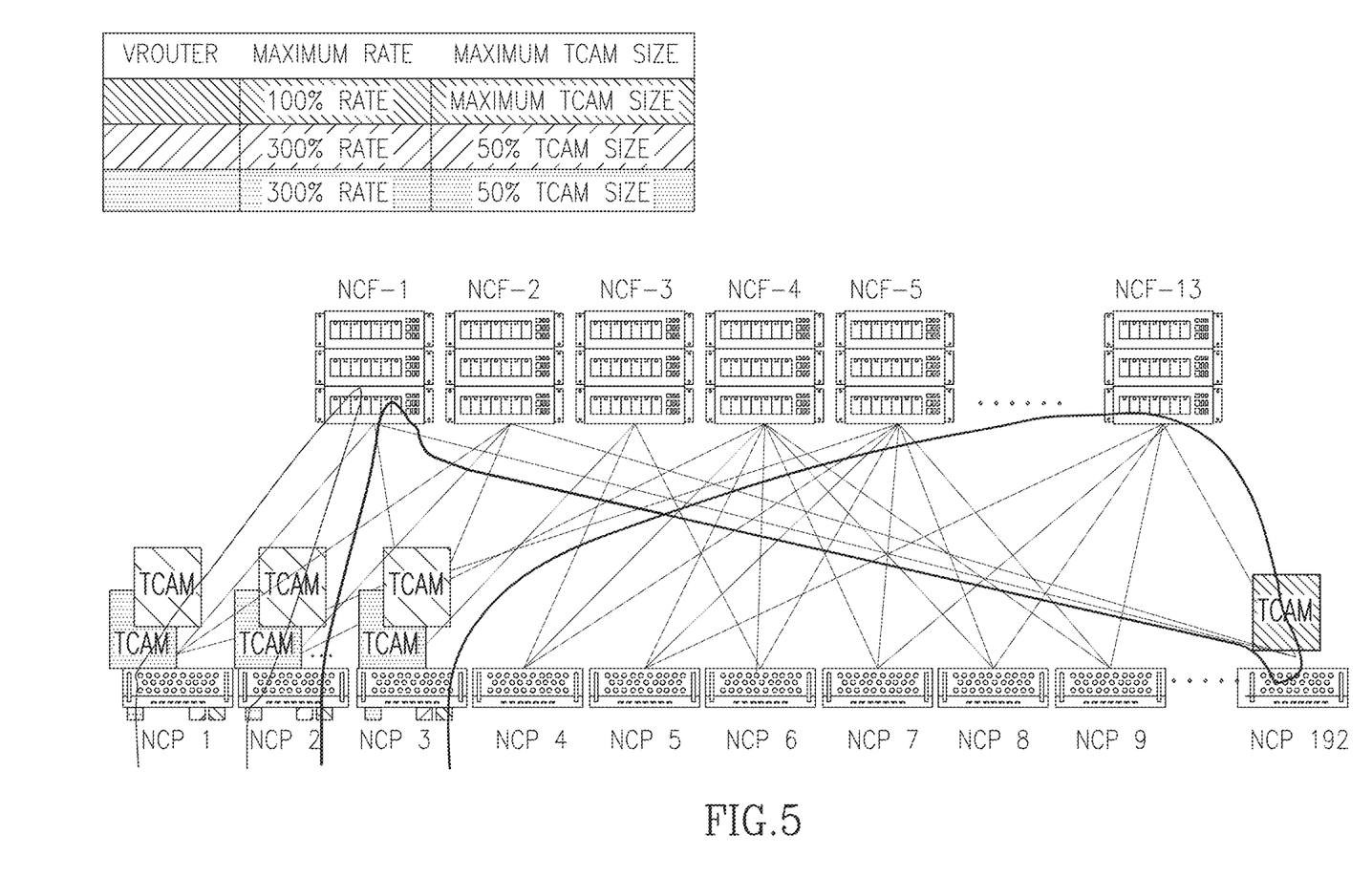
FIG. 5 illustrates over utilization of network processing resources in a cluster comprising a plurality of network processing units.

Nest, paging may preferably be carried out in order to select a relevant subset of NPUs from among the plurality of NPUs included in the cluster, which can serve a given traffic packet and the internal redirection of traffic to these NPUs (FIG. 5).

Figure 6:
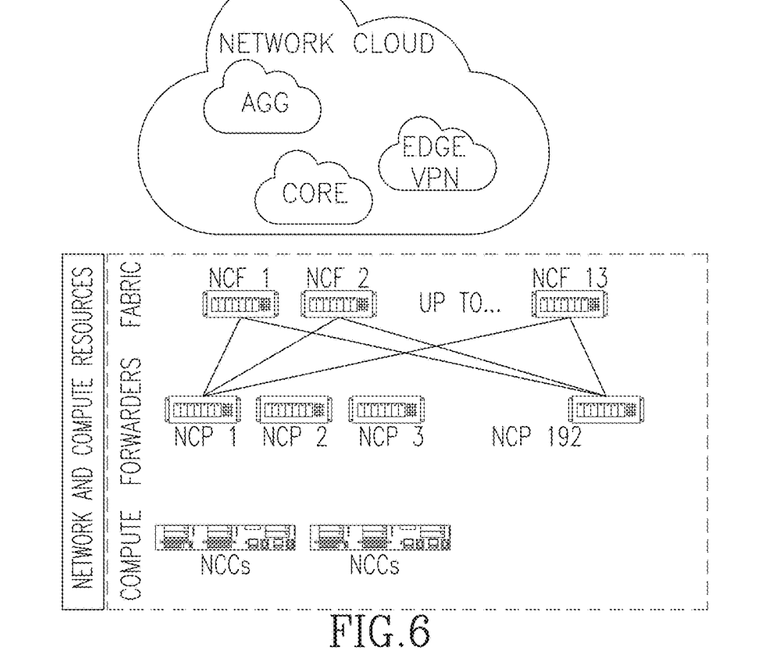
FIG. 6 demonstrates an example of a single platform configured to provide a plurality of services.

FIG. 6 demonstrates an example of a multi-service platform in which a plurality of services can be provided by a single platform. The platform comprising network and computing processing resources that are carried out by utilizing the following entities: Network Cloud Computing elements (NCCs) that are used as computing elements which run a plurality of computing functions. Then traffic is being forwarded by network cloud packet forwarders $NCP_1$ up to $NCP_N$ (where N can be for example as high as 192), to the network cloud fabric comprising elements $NCF_1$ to $NCF_M$ (where M can be for example as high as 13). This configuration enables selecting a subset of NPUs from among the plurality of NPUs included in the cluster for carrying out a paging activity.

Figure 7:
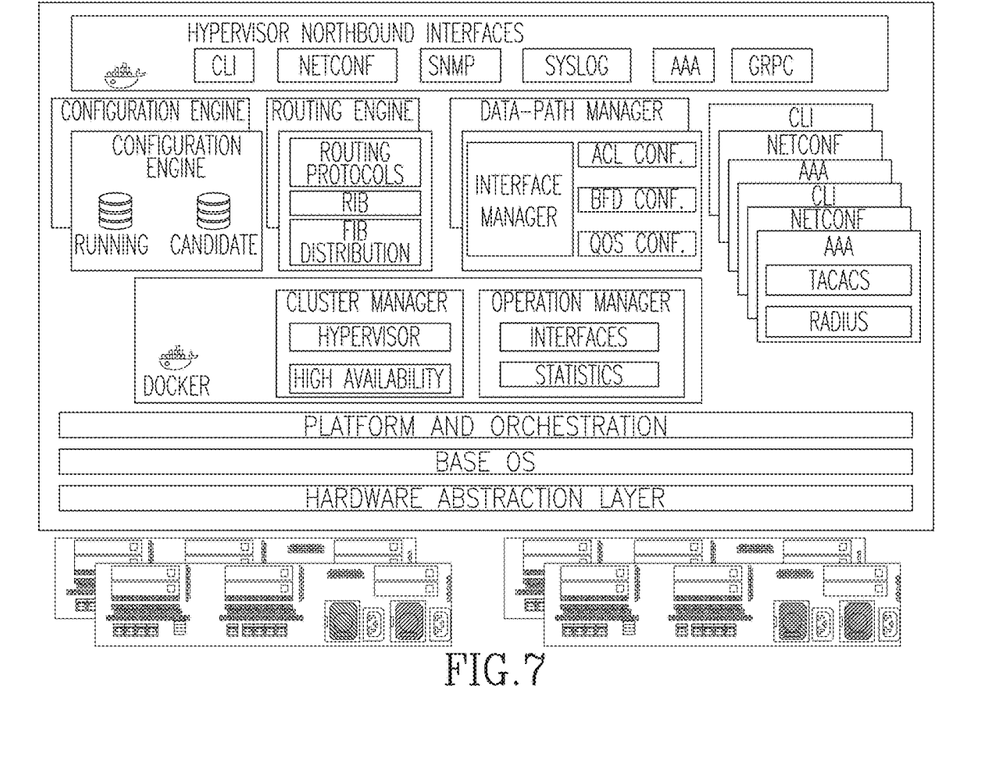
FIG. 7 presents a high-level architecture of a network operating system construed in accordance with an embodiment of the present invention.

FIG. 7 presents a high-level architecture of a network operating system construed in accordance with an embodiment of the present invention. As can be seen in this FIG., the architecture comprises a docker that comprises two managing entities. The first being a cluster manager that comprises hypervisor entity and a processor for determining current availability of processing resources associated with the various network processing elements, and the second being an operation manager that comprises interfaces and a processor for analyzing statistics received.

Figure 8:
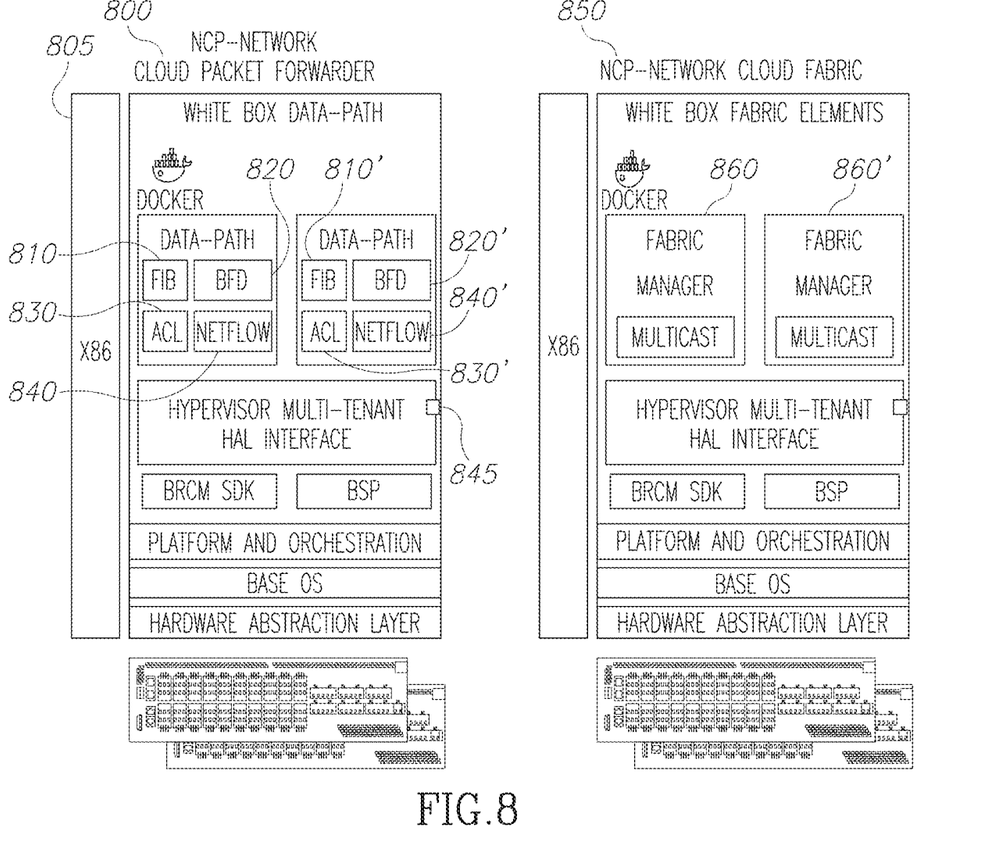
FIG. 8 illustrates examples of a network cloud packet forwarder and of a network fabric, both construed in accordance with embodiments of the present invention.

FOG. 8 illustrates examples of a network cloud packet forwarder and of a network fabric, both construed in accordance with embodiments of the present invention. Unit 800 is a schematic illustration of a network cloud packet forwarder (NCP) and unit 850 is a schematic illustration of a network cloud fabric (NCF).

Exemplified NCP 800 comprises elements of two white box data path. Each such data path of this embodiment of the present invention, comprises Forwarding Information Base (FIB) 810 and 810', Bidirectional Forwarding Detecting (BFD) elements 820 and 820', Access Control Lists (ACL) 830 and 830' and Netflow processors 840 and 840', which enable collecting IP network traffic as it enters or exits control and management interface 845. By analyzing the data provided by NetFlow, processor 805 can determine for example the source and destination of traffic, class of service, and the causes of congestion. These elements enable handling a high load of traffic by dividing/diverting certain tasks to other network processing elements that belong to the same cluster.

Exemplified NCF 850 comprises elements 860 and 860' of two white boxes that enable conveying traffic in a multi-casting mode.

Figure 9:
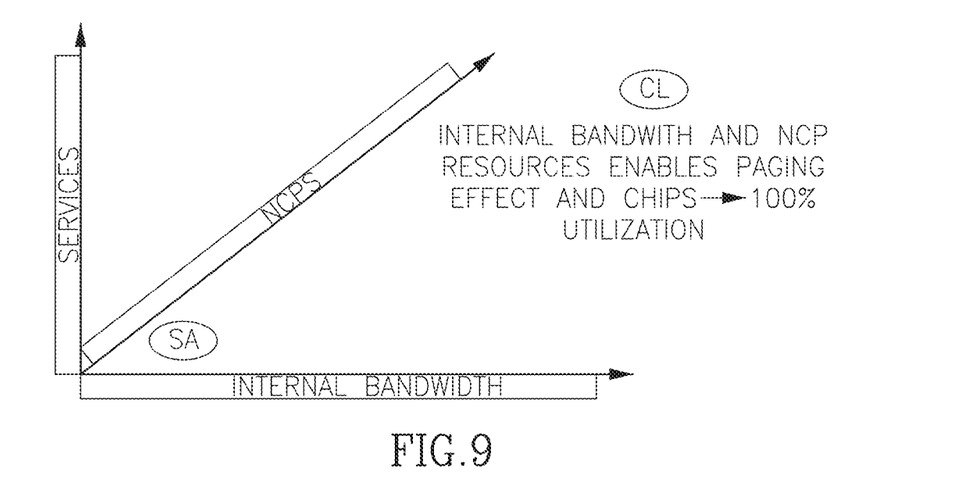
FIG. 9 demonstrates bandwidth-based paging according to an embodiment construed in accordance with the present invention.

FIG. 9 demonstrates bandwidth-based paging according to an embodiment construed in accordance with the present invention. The FIG., shows the increase in services that can be provided as a function of increasing the internal bandwidth and the number of NCPs. Thus, the internal bandwidth and the NCP resources enable affecting a paging mechanism, thereby achieving practically full (100%) utilization of these processing resources. It should be noted that an addition of one or more NCPs to the cluster, adds effectively computing and networking resources for carrying out the plurality of the services, thereby enabling a cost beneficial increase in the network capacity.

Figure 10:
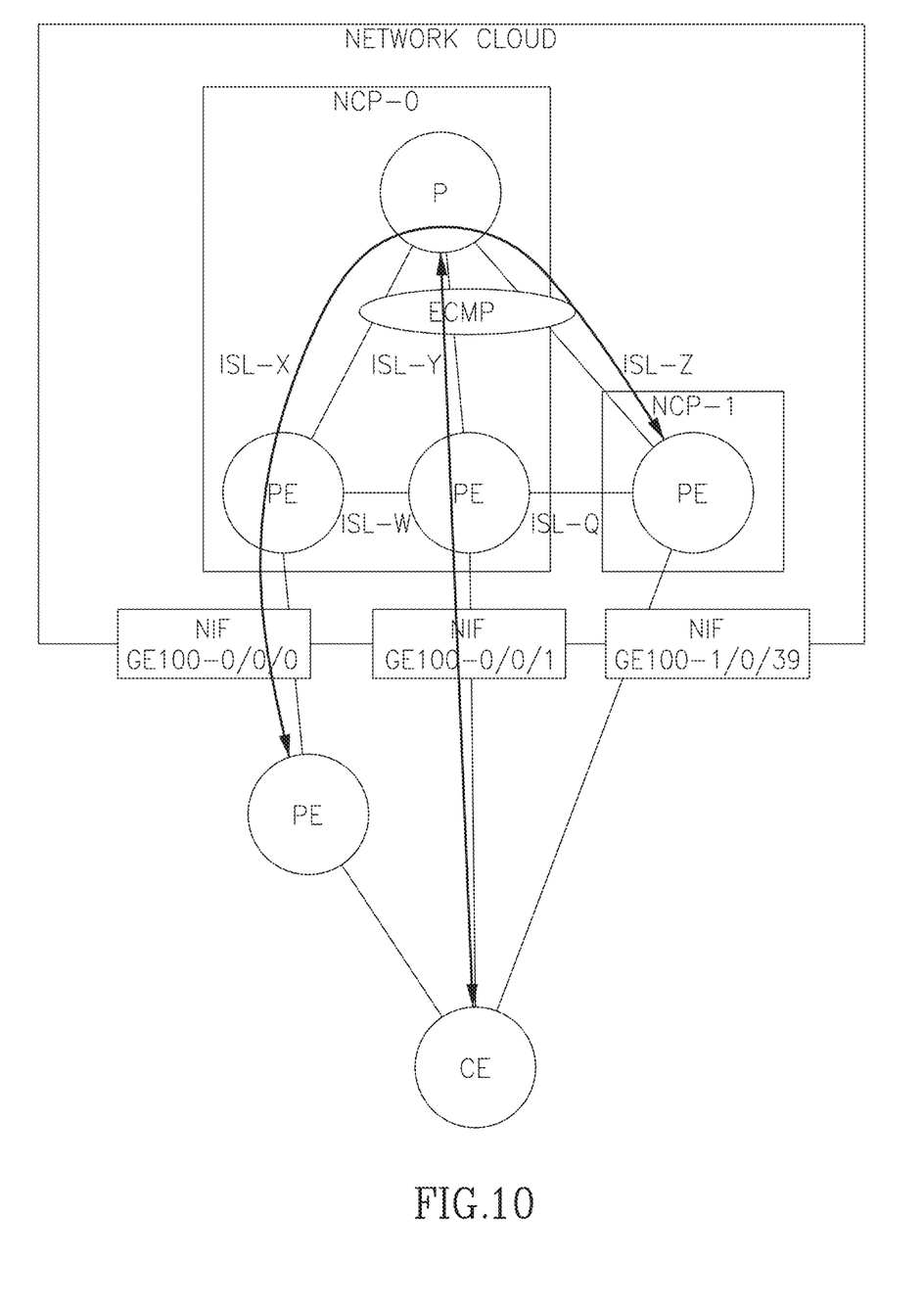
FIG. 10 demonstrates an implementation of an Inter Service Link ("ISL") configured to carry control and forwarded traffic between service instances over fabric interfaces.

FIG. 10 demonstrates a schematic overview of an implementation of an ISL (Inter Service Link) between different Service Instances. This link described in this example, is a uni-directional channel between each pair (when needed and provisioned) of instances among the plurality of services, allowing for native and transparent chaining in terms of both control and forwarded traffic. According to an embodiment of the invention, recycled ports may be used on the receiving element, namely, virtual ports that enable a packet to start a new cycle of packet processing.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A packet processor for use in a cluster comprising a plurality of packet processors, each comprising networking and computing processing resources, wherein said packet processor is configured to enable provisioning of a plurality of different services for conveying traffic packets, wherein said packet processor is configured to store state data associated with one or more network functions required for carrying out each of said plurality of different services, and wherein upon receiving a request for provisioning a service that is associated with current traffic being conveyed, determining by said packet processor, based on state data associated with one or more network functions required for carrying out the requested service, whether instantaneous availability of its resources would enable provisioning at least part of the requested service, and if affirmative, providing at least part of the requested service by said packet processor, whereas if based on state data associated with the one or more network functions required for carrying out the requested service it is determined that the instantaneous availability of the resources of said packet processor does not enable providing at least part of the requested service by said packet processor, the requested service will be provided by one or more other packet processors that belong to said cluster.

2. The packet processor of claim 1, wherein a request for the provisioning of said service that was directed to the other packet processor, is forwarded from said other packet processor to said packet processor in response to said other packet processor being under congestion.

3. The packet processor of claim 1, wherein the request for the provisioning of said service that was directed to the other packet processor, is forwarded from said other packet processor to said packet processor in response to determining that said other packet processor is not provided with available processing resources that could have enabled it to provide the required service.

4. The packet processor of claim 1, further configured to receive a request for the provisioning of a service at any port from among the ports associated with said packet processor, irrespective of whether said service can be provided via said receiving port.

5. The packet processor of claim 1, comprising a non-IP interface configured to implement an Inter Service Link (ISL) through which control and data traffic is forwarded between different network functions over the network fabric as if the packet processors belonging to the cluster are physically connected there-between.

6. The packet processor of claim 1, wherein said packet processor is configured to enable provisioning of a plurality of different services for conveying traffic packets to/from enterprises and/or mobile users and/or broadband users.

7. The packet processor of claim 1, configured to operate at a maximal rate, while its memory means is assigned to serve an optimized number of network functions.

8. A system comprising a cluster comprising a plurality of packet processors wherein each of said plurality of packet processors comprises networking and computing processing resources and is configured to enable provisioning of a plurality of different services for conveying traffic packets, wherein each of said plurality of packet processors is configured to store state data associated with one or more network functions required for carrying out each of said plurality of different services, and wherein each of said plurality of packet processors is further configured that upon receiving a request for provisioning a service that is associated with current traffic being conveyed, to determine, based on state data associated with one or more network functions required for carrying out the requested service, whether instantaneous availability of the resources of a respective packet processor would enable provisioning at least part of the requested service, and if affirmative, providing at least part the requested service by said respective packet processor, whereas if based on state data associated with the one or more network functions required for carrying out the requested service it is determined that the instantaneous availability of the resources of said respective packet processor does not enable providing at least part of the requested service by said respective packet processor, the requested service will be provided by one or more other packet processors that belong to said cluster.

9. The system of claim 8, wherein said system is configured to provide a plurality of services, where each of these services is provided by using a number of packet processors selected from among that plurality of packet processors, while at least two of the selected packet processors carry out each at least one different task from the one or more tasks carried by the other of the at least two packet processors, for the provisioning of a single service.

* * * * *